(12) United States Patent
Laden et al.

(10) Patent No.: US 10,126,980 B2
(45) Date of Patent: Nov. 13, 2018

(54) MANAGING DATA OPERATIONS IN A QUORUM-BASED DATA REPLICATION SYSTEM

(71) Applicant: International Business Machines Corporation, Armonk, NY (US)

(72) Inventors: Guy Laden, Tel-Aviv (IL); Benjamin Mandler, Zichron Yaakov (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/698,874

(22) Filed: Apr. 29, 2015

(65) Prior Publication Data
US 2017/0177277 A1     Jun. 22, 2017

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01); *H05K 999/99* (2013.01)

(58) Field of Classification Search
CPC ...... G06F 3/0659; G06F 3/0604; G06F 3/065; G06F 3/067; G06F 2212/1041
See application file for complete search history.

(56) References Cited

U.S. PATENT DOCUMENTS

| | | | | |
|---|---|---|---|---|
| 8,402,061 | B1 * | 3/2013 | Briggs | G06F 17/30091 707/706 |
| 8,510,304 | B1 * | 8/2013 | Briggs | G06F 17/30312 707/736 |
| 8,688,666 | B1 * | 4/2014 | Briggs | G06F 17/30318 707/705 |
| 8,843,441 | B1 | 9/2014 | Rath et al. | |
| 8,972,405 | B1 * | 3/2015 | Chaulk | G06F 17/30194 707/737 |
| 9,940,042 | B2 * | 4/2018 | Agetsuma | G06F 3/0619 |

(Continued)

OTHER PUBLICATIONS

Jemal H. Abawajy et al., "Data Replication Approach with Consistency Guarantee for Data Grid", Computers, IEEE Transactions on (vol. 63 , Issue: 12 ), pp. 2975-2987, Sep. 13, 2013.

(Continued)

*Primary Examiner* — Mano Padmanabhan
*Assistant Examiner* — Andrew J Cheong (57) ABSTRACT

When a request is received to perform a data operation requiring an interaction with any one of multiple data replicas stored on one or more data storage devices and managed by a quorum-based data management protocol in which completion of a data update is reported to an initiator of the data update when acceptance of the data update is reported by a majority of the data replicas, the data operation is routed to be performed using one of a predefined minority of the data replicas if the data operation requires less than strong consistency, is a read-only data operation, and meets a predefined criterion of being computationally time-intensive or computationally resource-intensive, or routed to be performed using a predefined majority of the data replicas if the data operation requires strong consistency or requires a data write operation or does not meet the predefined criterion.

11 Claims, 6 Drawing Sheets

(56) References Cited

U.S. PATENT DOCUMENTS

| | | | |
|---|---|---|---|
| 2010/0299139 A1* | 11/2010 | Ferrucci | G06F 17/30654 |
| | | | 704/9 |
| 2011/0289052 A1* | 11/2011 | Rambacher | G06F 17/30575 |
| | | | 707/624 |
| 2012/0239722 A1* | 9/2012 | Bolosky | G06F 17/30581 |
| | | | 709/201 |
| 2012/0254342 A1* | 10/2012 | Evans | G06F 11/186 |
| | | | 709/214 |
| 2013/0110774 A1 | 5/2013 | Shah et al. | |
| 2013/0110781 A1 | 5/2013 | Golab et al. | |
| 2013/0290249 A1 | 10/2013 | Merriman et al. | |
| 2014/0095813 A1* | 4/2014 | Shukla | G06F 3/0611 |
| | | | 711/154 |
| 2014/0164831 A1 | 6/2014 | Merriman et al. | |
| 2014/0181026 A1* | 6/2014 | Bolosky | G06F 17/30581 |
| | | | 707/634 |
| 2016/0139841 A1* | 5/2016 | Agetsuma | G06F 3/06 |
| | | | 711/162 |

OTHER PUBLICATIONS

Donald Kossmann et al., "Cloudy: a modular cloud storage system", Journal Proceedings of the VLDB Endowment VLDB Endowment Hompage archive, vol. 3 Issue 1-2, Sep. 2010 ,pp. 1533-1536.

Leslie Lamport., "The Part-Time Parliament", ACM Trans. Comput. Syst., vol. 16, No. 2, pp. 133-169, May 1998.

Tushar D. Chandra et al., "Paxos made live: an engineering perspective", PODC '07: 26th ACM Symposium on Principles of Distributed Computing, 2007, pp. 398-407.

\* cited by examiner

MANAGING DATA OPERATIONS IN A QUORUM-BASED DATA REPLICATION SYSTEM

BACKGROUND

When a computer software application initiates an operation to update the data in a quorum-based data replication system, such as a system that uses Paxos protocols where multiple replicas of data are stored on one or more data storage devices, completion of the data update is reported to the application when acceptance of the data update is reported by a majority of the data replicas. In many types of applications, some types of these operations are of short duration, and may require few computational resources, but are important to complete quickly, whereas other types of operations that involve read-only transactions that are of longer duration and/or are more computationally resource-intensive are less important to complete quickly. Supporting such operations in a quorum-based data replication system using conventional techniques often leads to situations where short, simple data operations are blocked while long, complex data operations are being performed. This is especially undesirable where the short, simple data operations are high-priority write operations.

SUMMARY

In one aspect of the invention a method is provided for managing data operations in a quorum-based data replication system, the method including receiving a request to perform a data operation that requires an interaction with any one of multiple data replicas, where the data replicas are stored on one or more data storage devices, and where the data replicas are managed by a quorum-based data management protocol in which completion of a data update is reported to an initiator of the data update when acceptance of the data update is reported by a majority of the data replicas, routing the data operation to be performed using one of a predefined minority of the data replicas if the data operation requires less than strong consistency and is a read-only data operation and meets a predefined criterion of being computationally time-intensive or computationally resource-intensive, and routing the data operation to be performed using a predefined majority of the data replicas if the data operation requires strong consistency or requires a data write operation or does not meet the predefined criterion of being computationally time-intensive or computationally resource-intensive.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
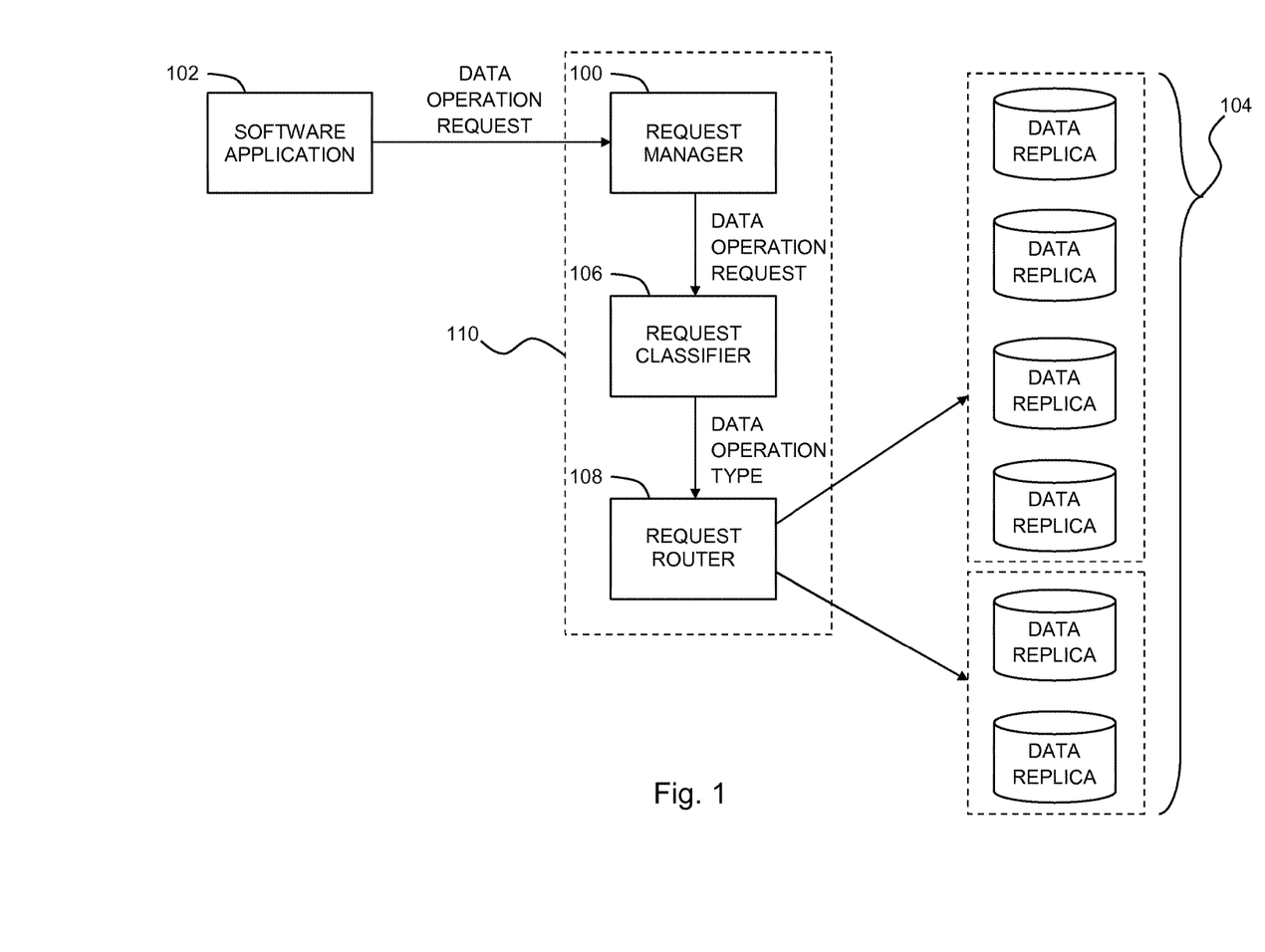
FIG. 1 is a simplified conceptual illustration of a system for managing data operations in a quorum-based data replication system, constructed and operative in accordance with an embodiment of the invention.

Reference is now made to FIG. 1, which is a simplified conceptual illustration of a system for managing data operations in a quorum-based data replication system, constructed and operative in accordance with an embodiment of the invention. In the system of FIG. 1 a request manager 100 is configured to receive a request, such as from a computer software application 102, to perform a data operation that requires an interaction with any one of multiple data replicas 104. Data replicas 104 are stored on one or more data storage devices and are preferably managed by a quorum-based data management protocol, such as the Paxos protocol as described in L. Lamport, "The part-time parliament," ACM Trans. Comput. Syst., vol. 16, no. 2, pp. 133-169, May 1998, and T. Chandra, R. Griesemer, and J. Redstone, "Paxos Made Live—An Engineering Perspective," PODC '07: 26th ACM Symposium on Principles of Distributed Computing, 2007, in which completion of an update to data stored by the data replicas 104 is reported to an initiator of the data update when acceptance of the data update is reported by a majority of data replicas 104, and in which a high-consistency read also involves an operation that either requires a response from a majority of data replicas 104 or requires that they are directed to a cluster "leader" node among the data replicas which coordinates and synchronizes all data operations.

A request classifier 106 is configured to determine whether the requested data operation requires strong consistency or less than strong consistency, whether the data operation is a read-only data operation, and whether the data operation meets a predefined criterion of being computationally time-intensive or computationally resource-intensive, such as where the criterion is based on predefined time and resource thresholds. Request classifier 106 preferably makes the above determinations based on information sent by computer software application 102 to request classifier 106, such as in messages related to the requested data operation. Additionally or alternatively, request classifier 106 makes the above determinations using a classifier plug-in provided to request classifier 106. Request classifier 106 may make the above determinations using conventional automated classification techniques, such as using machine learning techniques. For example, request classifier 106 may perform a textual analysis of query strings of the requested data operation and employ heuristics to estimate the time required to perform the data operation, or may correlate a query structure of the requested data operation with observed time requirements of previous data operations with similar query structures, thereby learning the time requirements of different types of data operations and classifying future data operations accordingly.

A request router 108 is configured to route the data operation to be performed using one of a predefined minority of the data replicas 104 if the data operation requires less than strong consistency and is a read-only data operation and meets one or more predefined criteria, such as of being computationally time-intensive or computationally resource-intensive. Such operations are referred to herein as "Long-ROR" operations. Request router 108 is also configured to route the data operation to be performed using a predefined majority of the data replicas if the data operation requires strong consistency or requires a data write operation or does not meet the predefined criteria, such as of being computationally time-intensive or computationally resource-intensive, where the predefined majority of data replicas 104 preferably includes a leader as designated by the quorum-based data management protocol. The predefined criteria used by request router 108 may additionally or alternatively include other criteria, such as whether the data operation is a high-priority read operation which may be routed to the data replica that is most likely to execute it quickly, where this is determinable, even if that data replica is in the predefined majority, rather than in the minority.

In an alternative embodiment, request manager 100, request classifier 106, and request router 108 are implemented collectively in a single router 110, which may be any existing computer or router that is configurable to operate as request manager 100, request classifier 106, and request router 108 as described hereinabove.

Any of the elements shown in FIG. 1 are preferably implemented in computer hardware and/or in computer software embodied in a non-transitory, computer-readable medium in accordance with conventional techniques.

Figure 2:
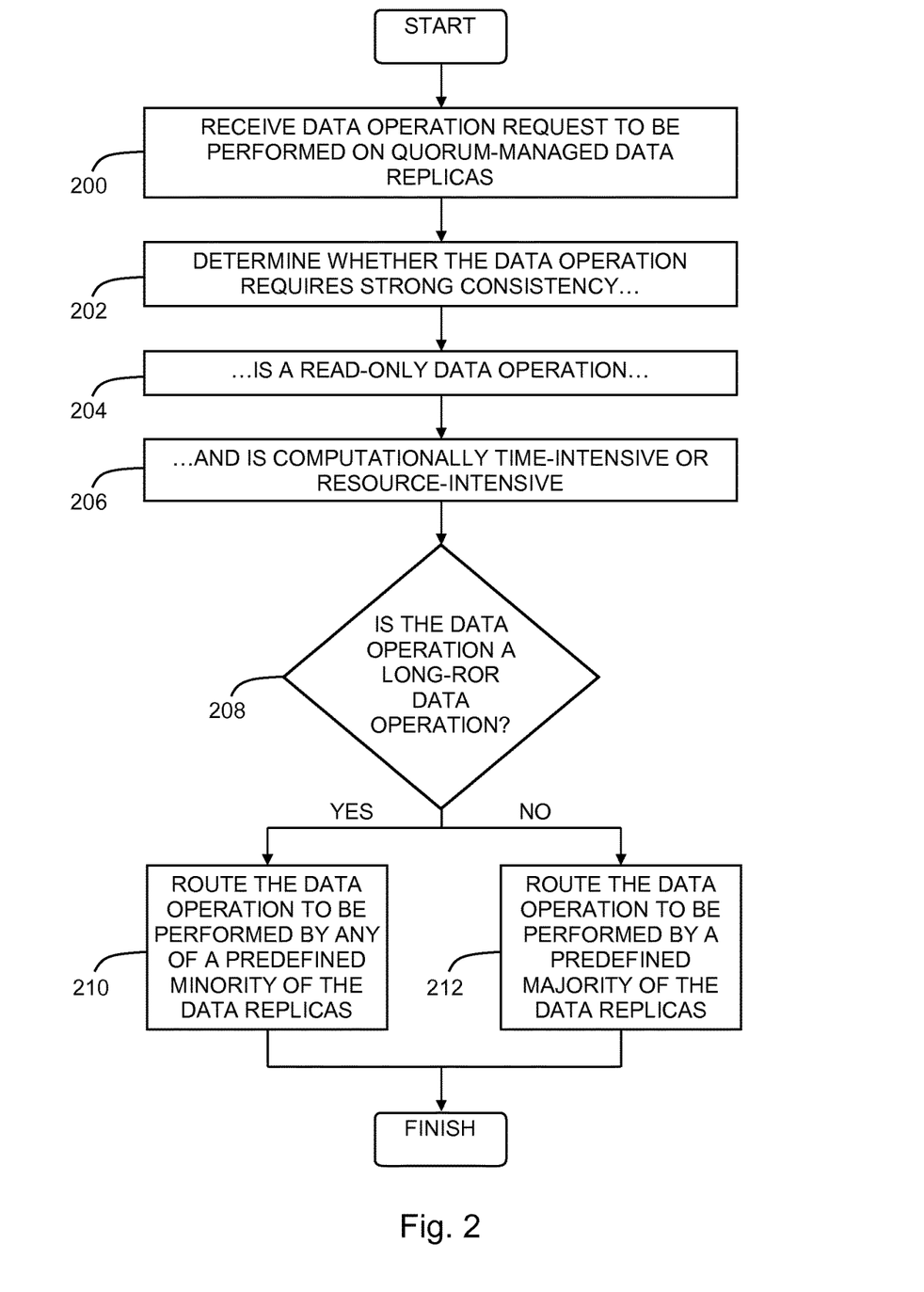
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a request is received to perform a data operation that requires an interaction with any one of multiple data replicas that are managed by a quorum-based data management protocol (step 200). A determination is made whether the requested data operation requires strong consistency or less than strong consistency (step 202), whether the data operation is a read-only data operation (step 204), and whether the data operation meets one or more predefined criteria, such as of being computationally time-intensive or computationally resource-intensive (step 206). If the data operation requires less than strong consistency and is a read-only data operation and meets the predefined criterion of being computationally time-intensive or computationally resource-intensive (step 208), the data operation is routed to be performed using one of a predefined minority of the data replicas (step 210). However, if the data operation requires strong consistency or requires a data write operation or does not meet the predefined criteria, such as of being computationally time-intensive or computationally resource-intensive, the data operation is routed to be to one of a predefined majority of the data replicas (step 212).

Figure 3A:
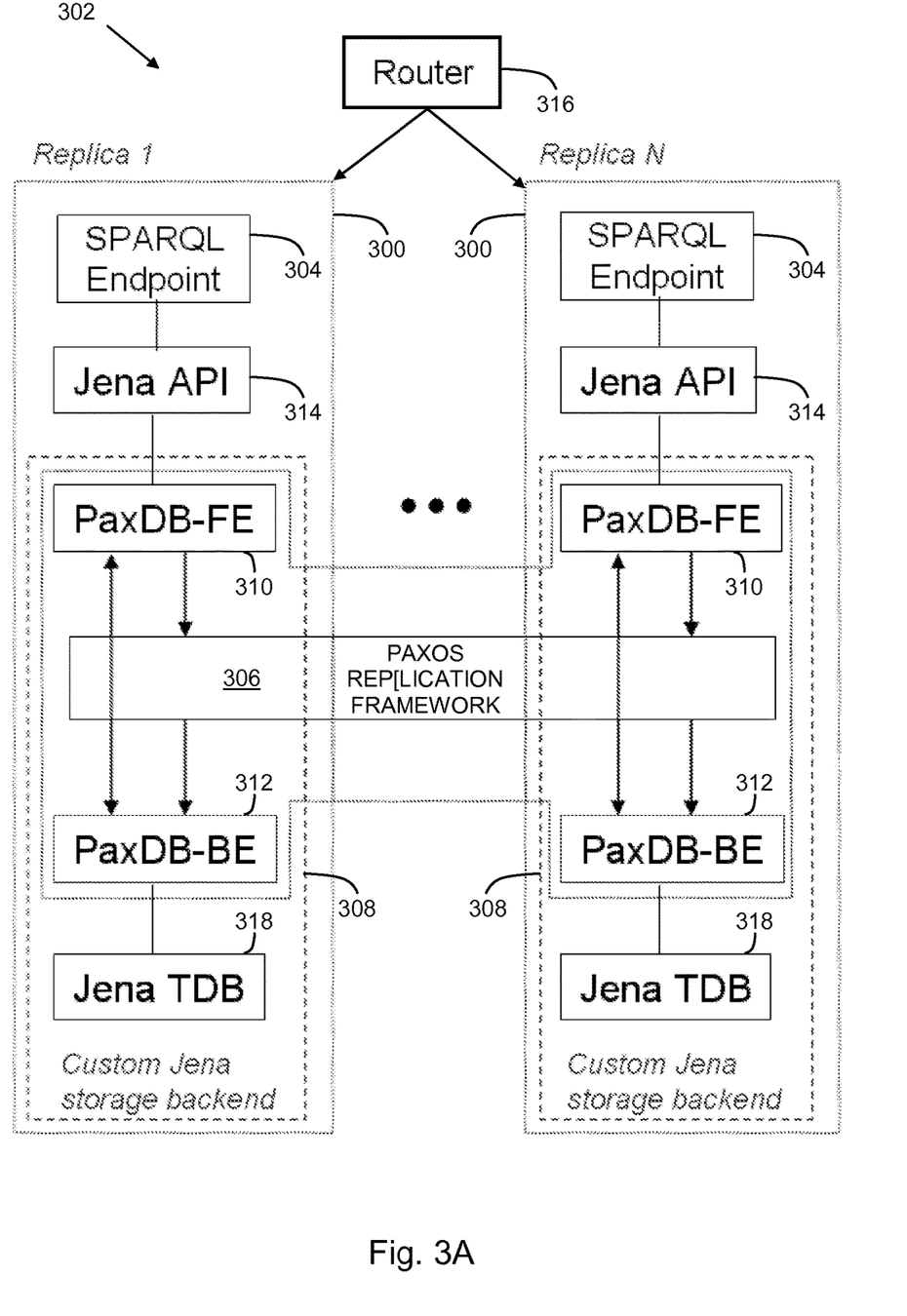
FIGS. 3A, 3B, and 3C illustrate an exemplary implementation of the system of FIG. 1 and method of FIG. 2.
Figure 3B:
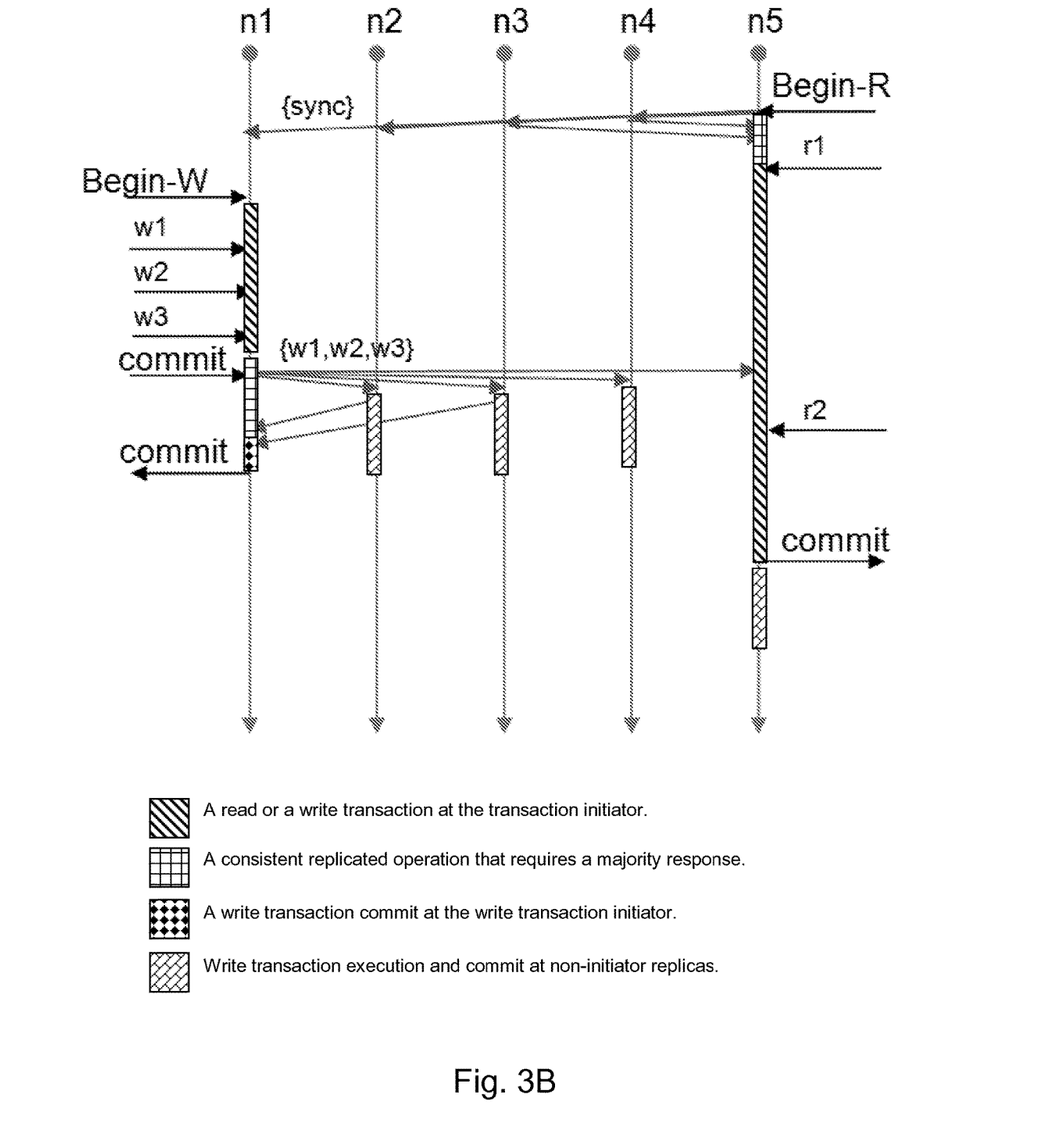
Figure 3C:
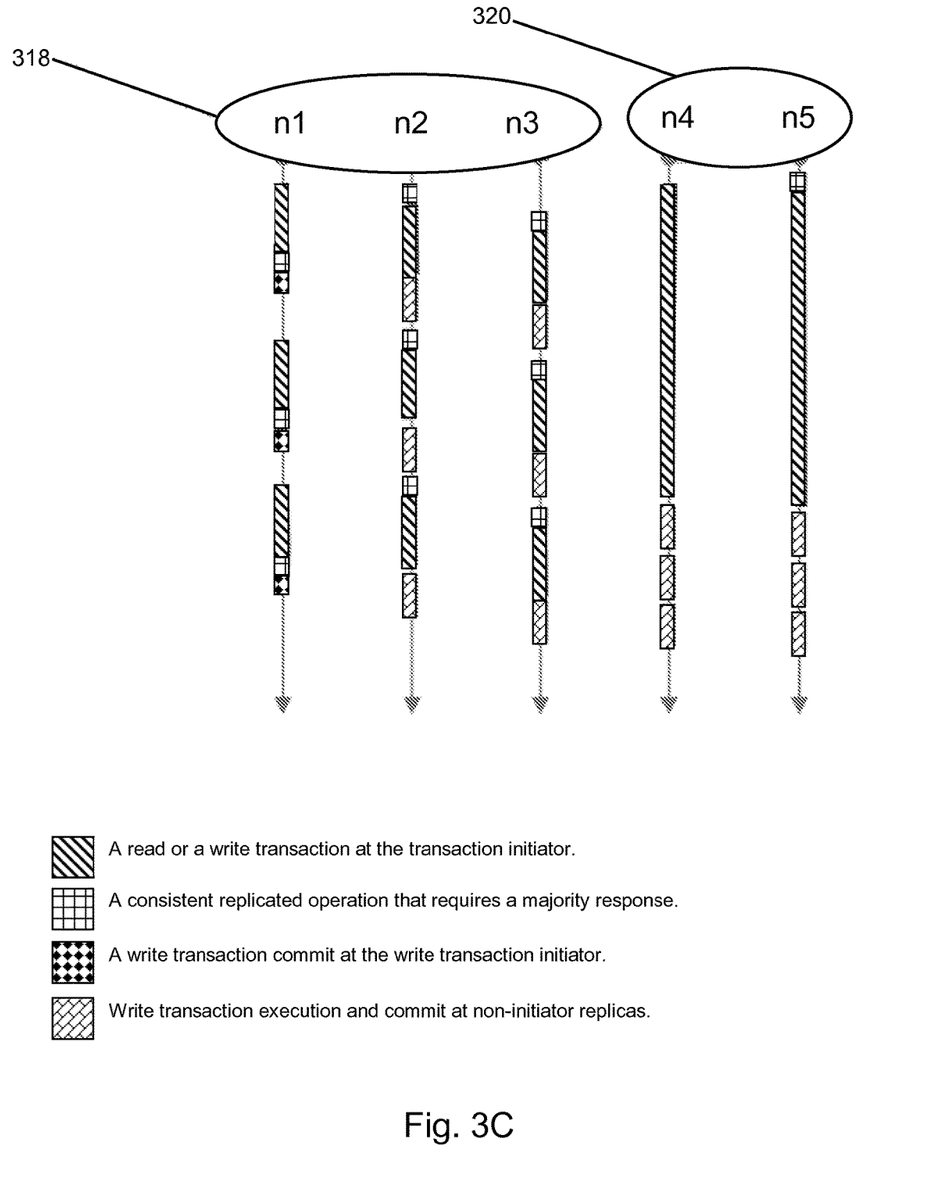

The system of FIG. 1 and method of FIG. 2 may be further appreciated in the context of the following example with reference to FIGS. 3A, 3B, and 3C. In FIG. 3A, a cluster of multiple data replicas 300 is shown of an Resource Description Framework (RDF) linked data store 302, such as of service registry data. Replicated RDF store 302 is based on an integration of an Apache Jena™ single-node RDF Store, labelled as Jena TDB 318, with a Paxos-based replication framework 306, and a SPARQL endpoint 304 (Apache Jena™ is available for licensing from the Apache Software Foundation, Forest Hill, Md., USA). A replicated Apache Jena™ pluggable storage backend 308 includes a front-end 310, also labelled "PaxDB-FE," and a back-end 312, also labelled "PaxDB-BE." Front-end 310 is invoked by an Apache Jena™ API layer 314 and invokes the replication framework to replicate any updates. Back-end 312 is invoked by replication framework 306 on receipt of replication messages. Back-end 312 invokes Apache Jena™ TDB 318 to manage disk storage on the local node in accordance with standard Apache Jena™ protocols.

Apache Jena™ TDB 318 supports multi-operation ACID (Atomicity, Consistency, Isolation, Durability) transactions, and in order for Replicated RDF store 302 to support such transactions while ensuring that an in-progress transaction is not visible to other concurrent transactions until it is committed, the following approach is preferably followed:

At any point in time only a single write transaction is allowed to be open among the replicas;

There can be multiple concurrent read transactions occurring among the replicas;

Each server that manages a given data replica 300 is limited to processing either a single open write transaction or multiple concurrent read transactions at any given moment.

A data replica cluster-coordination mechanism is also preferably employed to ensure that only a single server that manages a given data replica 300 can perform a write transaction at any given time. For example a distributed leader election algorithm and leases can be adopted to designate a single server that may perform write transactions and ensure that it is the only server that may perform write transactions. Alternatively, a locking-scheme over Paxos may be used to ensure that only the lock holder will succeed in performing an update to its replica.

Replicated RDF store 302 also preferably uses the following mechanisms to support multi-operation transactions:

Invocation of a Paxos "transaction begin" specifies whether the transaction is a read or write transaction;

Reduced-consistency read transactions are handled locally by the receiving replica, even where the replica lags the latest data replica cluster state;

High-consistency read transactions involve sending a small ("sync") request to all replicas, and only when a response is received from a majority of replicas is the read handled locally by the receiving replica;

Write transactions begin with a write request that router 316 sends to one of the majority of replicas which acts as the "initiator" of the write transaction among the majority of the replicas, and the write request is propagated to the rest of the majority. Any subsequent write requests received while the majority processes a given write request are held in a buffer by PaxDB-FE front-end 310 in whichever replica is the initiator of the given write transaction. Only on invocation of a Paxos "commit" is the next buffered write request processed by the majority. The actual commit operation is performed only once at least a majority of the replicas have acknowledged that they have performed the requested write operation.

In this example, a write transaction that is being performed on a given replica will block all other operations from being performed using that replica. However, the other replicas in the cluster are not affected while this transaction is being performed and may themselves perform other read transactions.

The time-line diagram in FIG. 3B illustrates how read and write transactions can be concurrently executed on a cluster of data replicas n1 through n5 such that neither transaction type blocks the other. While a long-running read transaction is processed using replica n5, a write transaction is processed in its entirety using replica n1, including replication to a majority of the other replicas n2, n3, and n4, and the write transaction is thereby committed before the read transaction is completed. This shows how the long-running read transaction does not block the cluster from processing write transactions.

The time-line diagram in FIG. 3C illustrates how routing Long-ROR data operations to a minority 320 of replicas (n4, n5) allows a majority 318 of replicas (n1,n2,n3) to be used for write operations and short read operations.

The partitioning of data replicas in a cluster between a minority of the replicas for handling Long-ROR operations and a majority of the replicas for handling non-Long-ROR operations may be dynamic rather than static. In this variant, a given data replica could be used for processing a Long- ROR operation, and later could be used to process a non-Long-ROR operation, provided that at any point in time there is a minority of replicas used for processing Long-ROR operations, and this can be enforced by the router using either a static division or a dynamic one.

Additional flexibility can be gained by aborting Long-ROR operations while they are being processed, such as when there are many Long-ROR operations at a time where there are not many non-Long-ROR operations. In this scenario, Long-ROR operations could be routed to any number of replicas, as long as there are no non-Long-ROR operations that are pending or queued. If a non-Long-ROR operation is initiated, a currently-processed Long-ROR operation could be aborted. If another non-Long-ROR operation arrives at the router, this can be done again, until a user-defined optimal ratio is achieved between the number of replicas used for processing Long-ROR operations and the number of replicas used for processing non-Long-ROR operations.

Figure 4:
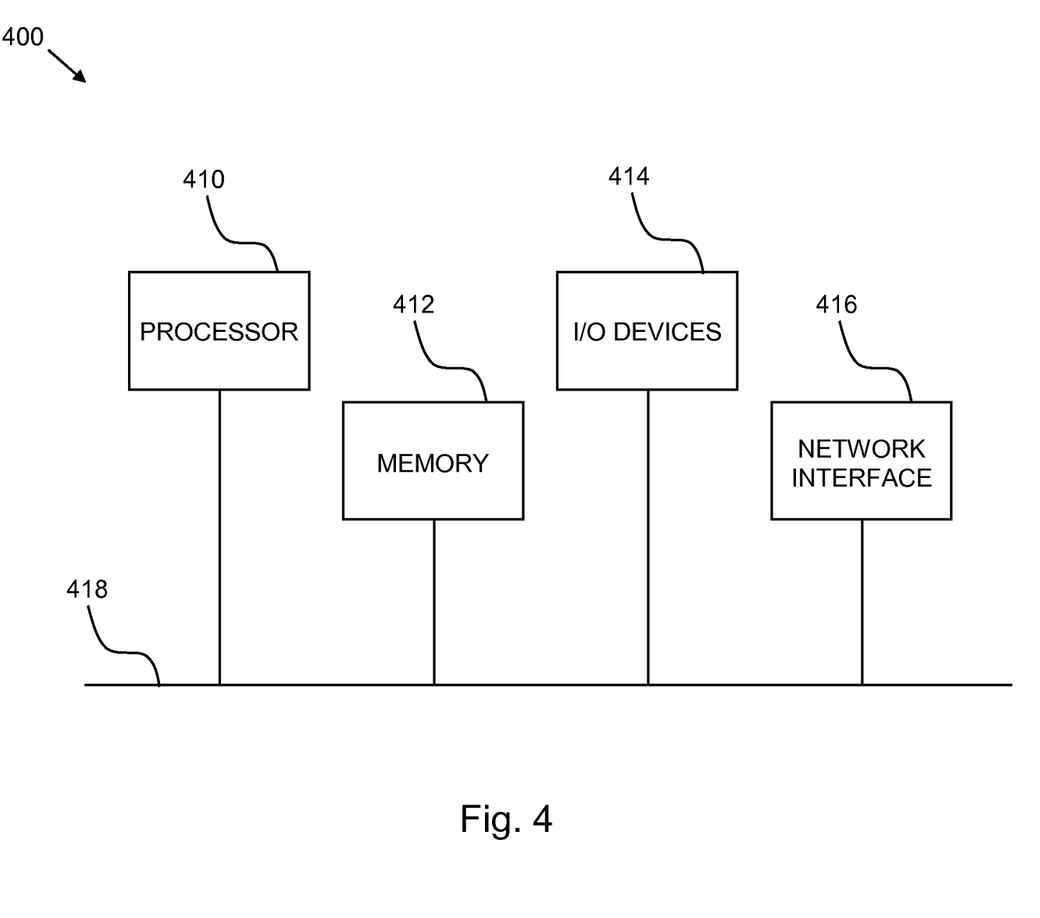
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3C) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing data operations in a quorum-based data replication system, the method comprising:

partitioning a plurality of data replicas into two partitions,
wherein one of the partitions includes a predefined minority of the data replicas,
wherein the other of the partitions includes a predefined majority of the data replicas,
wherein each of the data replicas is included in only one of the partitions,
wherein the predefined minority of the data replicas is designated to receive data operation requests that require less than strong consistency and are read-only data operations and require at least a predefined measure of any of computation time and computation resources, and
wherein the predefined majority of the data replicas is designated to receive data operation requests that require strong consistency or require a data write operation or require less than the predefined measure of any of computation time and computation resources;

receiving a request to perform a data operation that requires an interaction with any one of the plurality of data replicas,
wherein the data replicas are stored on one or more data storage devices, and
wherein the data replicas are managed by a quorum-based data management protocol in which completion of a data update is reported to an initiator of the data update when acceptance of the data update is reported by more than half of the data replicas;

determining whether the data operation that requires an interaction with any one of the plurality of data replicas requires less than strong consistency and is a read-only data operation and requires at least the predefined measure of any of computation time and computation resources;

routing the request to one of the predefined minority of the data replicas responsive to determining that the data operation requires less than strong consistency and is a read-only data operation and requires at least the predefined measure of any of computation time and computation resources; and routing the request to one of the predefined majority of the data replicas responsive to determining that the data operation requires strong consistency or requires a data write operation or requires less than the predefined measure of any of computation time and computation resources.

2. The method of claim 1 wherein the routing the request to one of the predefined minority or predefined majority of the data replicas is performed to data replicas that store Resource Description Framework (RDF) linked data.

3. The method of claim 1 wherein the routing to the predefined majority of the data replicas is performed wherein the predefined majority of the data replicas includes a protocol-designated leader.

4. The method of claim 1 wherein the receiving the request to perform a data operation that requires an interaction with any one of the plurality of data replicas and the routing the request to one of the predefined minority or predefined majority of the data replicas are implemented in any of
a) computer hardware, and
b) computer software embodied in a non-transitory, computer-readable medium.

5. A system for managing data operations in a quorum-based data replication system, the system comprising:
a plurality of data replicas partitioned into two partitions, wherein one of the partitions includes a predefined minority of the data replicas, wherein the other of the partitions includes a predefined majority of the data replicas, wherein each of the data replicas is included in only one of the partitions, wherein the predefined minority of the data replicas is designated to receive data operation requests that require less than strong consistency and are read-only data operations and require at least a predefined measure of any of computation time and computation resources, and wherein the predefined majority of the data replicas is designated to receive data operation requests that require strong consistency or require a data write operation or require less than the predefined measure of any of computation time and computation resources;

a request manager configured to receive a request to perform a data operation that requires an interaction with any one of the plurality of data replicas, wherein the data replicas are stored on one or more data storage devices, and wherein the data replicas are managed by a quorum-based data management protocol in which completion of a data update is reported to an initiator of the data update when acceptance of the data update is reported by more than half of the data replicas; and a request router configured to determine whether the data operation that requires an interaction with any one of the plurality of data replicas requires less than strong consistency and is a read-only data operation and requires at least the predefined measure of any of computation time and computation resources, route the request to one of the predefined minority of the data replicas responsive to determining that the data operation requires less than strong consistency and is a read-only data operation and requires at least the predefined measure of any of computation time and computation resources, and route the request to one of the predefined majority of the data replicas responsive to determining that the data operation requires strong consistency or requires a data write operation or requires less than the predefined measure of any of computation time and computation resources.

6. The system of claim 5 wherein the data replicas store Resource Description Framework (RDF) linked data.

7. The system of claim 5 wherein the predefined majority of the data replicas includes a protocol-designated leader.

8. The system of claim 5 wherein the request manager and the request router are implemented in any of a) computer hardware, and b) computer software embodied in a non-transitory, computer-readable medium.

9. A computer program product for managing data operations in a quorum-based data replication system, the computer program product comprising:

a non-transitory, computer-readable storage medium; and computer-readable program code embodied in the storage medium, wherein the computer-readable program code is configured to partition a plurality of data replicas into two partitions, wherein one of the partitions includes a predefined minority of the data replicas, wherein the other of the partitions includes a predefined majority of the data replicas, wherein each of the data replicas is included in only one of the partitions, wherein the predefined minority of the data replicas is designated to receive data operation requests that require less than strong consistency and are read-only data operations and require at least a predefined measure of any of computation time and computation resources, and wherein the predefined majority of the data replicas is designated to receive data operation requests that require strong consistency or require a data write operation or require less than the predefined measure of any of computation time and computation resources, receive a request to perform a data operation that requires an interaction with any one of the plurality of data replicas, wherein the data replicas are stored on one or more data storage devices, and wherein the data replicas are managed by a quorum-based data management protocol in which completion of a data update is reported to an initiator of the data update when acceptance of the data update is reported by more than half of the data replicas, determine whether the data operation that requires an interaction with any one of the plurality of data replicas requires less than strong consistency and is a read-only data operation and requires at least the predefined measure of any of computation time and computation resources, route the request to one of the predefined minority of the data replicas responsive to determining that the data operation requires less than strong consistency and is a read-only data operation and requires at least the predefined measure of any of computation time and computation resources, and route the request to one of the predefined majority of the data replicas responsive to determining that the data operation requires strong consistency or requires a data write operation or requires less than the predefined measure of any of computation time and computation resources.

10. The computer program product of claim 9 wherein the data replicas store Resource Description Framework (RDF) linked data.

11. The computer program product of claim 9 wherein the predefined majority of the data replicas includes a protocol-designated leader.

* * * * *